W. TANSLEY.
Bark Mill.

No. 44,756.

Patented Oct. 18, 1864.

Witnesses:

Inventor:

UNITED STATES PATENT OFFICE.

WILLIAM TANSLEY, OF SALISBURY CENTRE, NEW YORK, ASSIGNOR TO STARBUCK BROTHERS, ABRAM GUIWITS, AND JAMES FLEMING.

IMPROVEMENT IN BARK-MILLS.

Specification forming part of Letters Patent No. 44,756, dated October 18, 1864.

*To all whom it may concern:*

Be it known that I, WILLIAM TANSLEY, of Salisbury Centre, county of Herkimer, State of New York, have invented a new and Improved Bark-Mill; and I do hereby declare that the following is a full, clear, and exact description thereof, reference being had to the accompanying drawings, making a part of this specification, in which—

Figure 1:
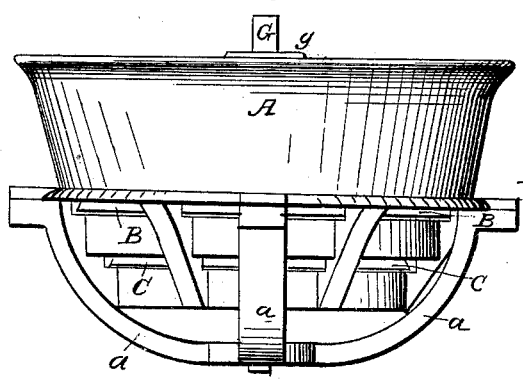
Figure 2:
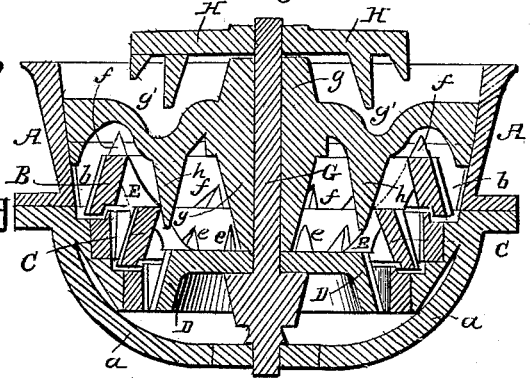
Figure 3:
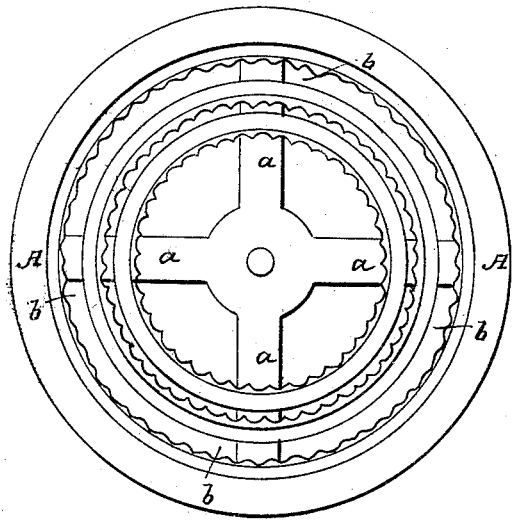
Figure 4:
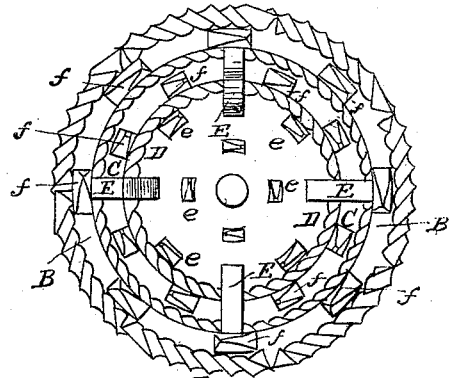
Figure 5:
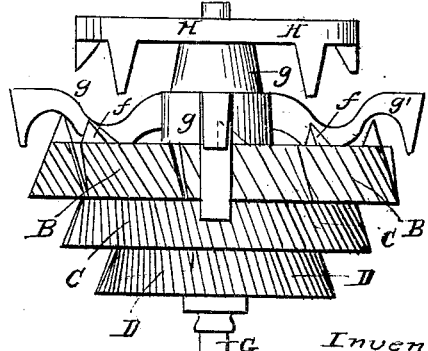

Figure 1 is a side elevation of my bark-mill. Fig. 2 is a diametrical section through the mill. Fig. 3 is a top view of the curb and graters. Fig. 4 is a top view of the runners. Fig. 5 is a side view of Fig. 4, showing the breakers and cross-arms applied.

Similar letters of reference indicate corresponding parts in the several figures.

The object of my invention and improvement in mills for grinding bark is to so arrange a series of toothed and serrated runners of different diameters in relation to a series of open stationary grating-rings of corresponding diameters that the breaking and cracking of the bark will be done centrally, while the grinding and discharge of the ground bark will be effected near the circumference of each runner, as will be hereinafter described.

To enable others skilled in the art to make and use my invention, I will describe its construction and operation.

In the accompanying drawings, A represents the curb of the mill, which is made with flanges on its bottom, by means of which the lower supporting-arms, $a\ a\ a\ a$, are attached to it. This curb is the frustum of a cone, inverted so that the smaller end will be downward, and on the inside of said curb A teeth $b$ are formed, as shown Figs. 2 and 3.

Below the lower end of the curb A two concentric rings of reduced diameter are secured to arms pendent from the curb. These rings are serrated on their inside surfaces, so that they constitute, with the teeth $b$, three tiers of graters for assisting in pulverizing the broken pieces of bark which are thrown off by the centrifugal action of the runners.

Within the curb A, and in a plane with the teeth thereon, is a runner, B, and beneath this runner is one of somewhat smaller diameter, (lettered C,) and beneath this latter runner, and in a plane with its respective grating-ring, is the bottom and smallest runner, D. These three runners are secured together in proper relations to their respective grating-rings by means of arms E E, (shown in Figs. 2 and 4,) and each runner is the frustum of a cone, as will be seen by reference to Fig. 5.

The smallest or bottom runner, D, is solid, and provided on its upper surface with teeth $e\ e$, and on its circumference with flutes or serrations, as shown in Figs. 2, 4, 5. The next larger and largest runners B C are rings, and have teeth $f\ f$ on their upper edges, as well as serrations on their circumference.

A shaft, G, passes centrally through and is affixed to the bottom runner, D. This shaft G is guided at its lower end by the arms $a$, and at its upper end by the hub $g$ of curved arms $g'$, as shown in Fig. 2. The power is applied to this shaft to drive the runners. The arms $g'\ g'$ are curved so as to pass downward from the central hub, $g$ and then over the uppermost runner. The teeth $k$, which are cast on these arms, project down slightly below the upper edge of the intermediate runner, and serve in conjunction with the teeth which are formed on the runners to break and crack the pieces of bark previously to its being thrown off and subjected to the action of the graters or grinding-teeth on the surfaces of the runners and stationary graters. The radial arms $a\ a\ a\ a$ are affixed to the curb A at their extremities, and consequently these arms are stationary.

Immediately above the arms $a$, and affixed to the shaft G, are two radial arms, H, each one of which carries two teeth, which are intended for breaking up the bark before it is brought in contact with the runners. The lower edges of the two runners B C are rabbeted so as to fit over the corresponding upper edges of the two circular graters, and thus prevent the escape of bark at these points.

It is well known that when a bark-mill is in operation the bark is thrown outward from the center of the mill against the curb; hence the greater part of the work is performed near the circumference of the mill, while the more central part prepares very little bark. In my arrangement this difficulty is entirely overcome, and the central parts of the mill perform the breaking and cracking of the bark, while the pulverizing is performed at the circumference, to which point the bark gravitates after it is broken up.

This mill is peculiarly adapted for grinding wet or damp bark, for the reason that the discharge of the ground bark takes place at several points, and consequently there will be no liability of the parts clogging.

It will be seen from the above description that I have an arrangement of independent grinders of gradually-reduced diameters arranged one beneath the other in such manner that each grinder discharges the ground bark from the mill as fast as it is ground, and also that the bark which is not ground by the first grinders falls down and is subjected to the second series, and so on through the entire series. By such an arrangement a free and open discharge can be effected, and the bark introduced into the upper end of the mill will be conducted to each one of the series of grinders by centrifugal force and gravity.

Having thus described my invention, what I claim as new, and desire to secure by Letters Patent, is—

1. A bark-mill which is constructed of a series of stationary grinding-rings and a series of rotating grinders arranged in such relation to each other that the grinding and the discharge of the ground bark will take place at the circumference of each runner, substantially as described.

2. In a bark-mill which is composed of a series of stationary and rotating grinding-rings, the employment of breaking-teeth arranged within the circumference of the grinding-surfaces in such manner as to prepare the bark for its reception between said surfaces, substantially as described.

3. The combination of the bottomless runners B C, with the solid bottom runner, D, arranged and operating in conjunction with a series of discharging-rings, substantially as described.

WILLIAM TANSLEY.

Witnesses:
ENOS E. COVELL,
STEPHEN T. STAFFORD.